(12) United States Patent
Gan-Mor et al.

(10) Patent No.: US 7,584,859 B2
(45) Date of Patent: Sep. 8, 2009

(54) AGRICULTURAL PRODUCE SEPARATOR

(75) Inventors: Samuel Gan-Mor, Gedera (IL); Ofer Juran, Yavne (IL)

(73) Assignee: The State of Israel, Ministry of Agriculture & Rural Development Agricultural Research Organization, Volcani Center, Beit Dagan (IL)

( * ) Notice: Subject to any disclaimer, the term of this patent is extended or adjusted under 35 U.S.C. 154(b) by 17 days.

(21) Appl. No.: 11/510,176

(22) Filed: Aug. 24, 2006

(65) Prior Publication Data

US 2008/0047879 A1 Feb. 28, 2008

(51) Int. Cl.
*B07C 5/00* (2006.01)
(52) U.S. Cl. .................. 209/640; 209/629; 209/699; 99/523; 99/604
(58) Field of Classification Search .............. 209/637, 209/640, 935
See application file for complete search history.

(56) References Cited

U.S. PATENT DOCUMENTS

| RE3,169 | E | * | 10/1868 | Holmes | 415/164 |
| 377,667 | A | * | 2/1888 | Chadwick | 209/629 |
| 1,116,221 | A | * | 11/1914 | Beyschlag | 99/523 |
| 1,170,839 | A | * | 2/1916 | Molloy | 99/604 |
| 1,692,343 | A | * | 11/1928 | Moller | 209/640 |
| RE31,169 | E | * | 3/1983 | Holmes | 209/699 |
| 4,584,825 | A | * | 4/1986 | Atkinson | 56/119 |
| 4,744,470 | A | * | 5/1988 | Feller et al. | 209/640 |
| 4,895,209 | A | * | 1/1990 | Margolin et al. | 171/18 |
| 5,271,506 | A | * | 12/1993 | Haines | 209/640 |
| 5,876,117 | A | * | 3/1999 | Chen | 366/320 |
| 6,627,174 | B1 | * | 9/2003 | Judat et al. | 423/659 |

* cited by examiner

*Primary Examiner*—Patrick H Mackey
*Assistant Examiner*—Terrell H Matthews
(74) *Attorney, Agent, or Firm*—Darby & Darby PC

(57) ABSTRACT

Apparatus for separating agricultural produce from stones and clods including at least one generally cylindrical separation assembly arranged to be impinged upon by a mixture of agricultural produce and at least one of stones and clods, the at least one generally cylindrical separation assembly including a plurality of generally mutually contiguous curved impact portions and a mounting assembly supporting the plurality of generally mutually contiguous curved impact portions, the mounting assembly including a metal principal support and at least one intermediate metal support element fixed to the metal principal support and to at least some of the plurality of generally mutually contiguous curved impact portions, the at least one intermediate metal support element having a resiliency greater than a resiliency of the metal principal support.

22 Claims, 8 Drawing Sheets

AGRICULTURAL PRODUCE SEPARATOR

FIELD OF THE INVENTION

The present invention relates to separators for separating agricultural products from spurious matter.

BACKGROUND OF THE INVENTION

The following U.S. Patents of applicant/assignee and the publications referenced therein, all of which are hereby incorporated by reference, are believed to represent the current state of the art:
  4,744,470 and 4,375,853.

SUMMARY OF THE INVENTION

The present invention seeks to provide an improved separator for separating agricultural products from spurious matter and particularly for separating potatoes from clods and stones.

There is thus provided in accordance with a preferred embodiment of the present invention apparatus for separating agricultural produce from stones and clods including at least one generally cylindrical separation assembly arranged to be impinged upon by a mixture of agricultural produce and at least one of stones and clods, the at least one generally cylindrical separation assembly including a plurality of generally mutually contiguous curved impact portions and a mounting assembly supporting the plurality of generally mutually contiguous curved impact portions, the mounting assembly including a metal principal support and at least one intermediate metal support element fixed to the metal principal support and to at least some of the plurality of generally mutually contiguous curved impact portions, the at least one intermediate metal support element having a resiliency greater than a resiliency of the metal principal support.

In accordance with a preferred embodiment of the present invention the at least one intermediate metal support element has a resiliency greater than a resiliency of the curved impact portions.

In accordance with another preferred embodiment of the present invention the at least one generally cylindrical separation assembly includes a circular cylindrical assembly.

In accordance with yet another preferred embodiment of the present invention the plurality of curved impact portions includes a plurality of helical rings. Additionally or alternatively, the plurality of curved impact portions includes a coil.

There is also provided in accordance with another preferred embodiment of the present invention a method for separating agricultural produce from stones and clods including providing a mixture of agricultural produce and at least one of stones and clods and causing the mixture to impinge on a separating apparatus including at least one generally cylindrical separation assembly including a plurality of generally mutually contiguous curved impact portions and a mounting assembly supporting the plurality of generally mutually contiguous curved impact portions, the mounting assembly including a metal principal support and at least one intermediate metal support element fixed to the metal principal support and to at least some of the plurality of generally mutually contiguous curved impact portions, the at least one intermediate metal support element having a resiliency greater than a resiliency of the metal principal support and separating at least part of the agricultural produce from the at least one of stones and clods.

In accordance with a preferred embodiment of the present invention the method includes receiving the agricultural produce in at least one first bin and receiving at least one of the stones and the clods in at least one second bin.

In accordance with a further preferred embodiment of the present invention the method includes, following the separating, transferring a remaining mixture of agricultural produce and at least one of clods and stones to impinge on the separating apparatus.

There is also provided in accordance with another preferred embodiment of the present invention apparatus for separating agricultural produce from stones and clods including at least a first and a second generally cylindrical separation assemblies arranged to be impinged upon by a mixture of agricultural produce and at least one of stones and clods, each of the at least first and second generally cylindrical separation assemblies including a plurality of generally mutually contiguous curved impact portions and a mounting assembly supporting the plurality of generally mutually contiguous curved impact portions, the mounting assembly including a metal principal support and at least one intermediate metal support element fixed to the metal principal support and to at least some of the plurality of generally mutually contiguous curved impact portions, the at least one intermediate metal support element having a resiliency greater than a resiliency of the metal principal support and a first conveyor configured to convey the mixture to impinge onto the first separation assembly and at least one second conveyor receiving a second mixture of agricultural produce and at least one of stones and clods from the first separation assembly and being configured to convey the second mixture to impinge at least on the second separation assembly.

In accordance with a preferred embodiment of the present invention the apparatus also includes at least one first collection bin configured to collect the agricultural produce and at least one second collection bin configured to collect at least one of the stones and the clods.

In accordance with another preferred embodiment of the present invention the apparatus also includes at least one recycling conveyor adapted to receive a third mixture of agricultural produce and at least one of stones and clods and to convey the third mixture to impinge on the first separation assembly.

There is also provided in accordance with yet another preferred embodiment of the present invention a vehicle for separating agricultural produce from stones and clods including a mounting vehicle and at least a first and a second generally cylindrical separation assemblies mounted onto the mounting vehicle and arranged to be impinged upon by a first mixture of agricultural produce and at least one of stones and clods, each of the at least first and second generally cylindrical separation assemblies including a plurality of generally mutually contiguous curved impact portions and a mounting assembly supporting the plurality of generally mutually contiguous curved impact portions, the mounting assembly including a metal principal support and at least one intermediate metal support element fixed to the metal principal support and to at least some of the plurality of generally mutually contiguous curved impact portions, the at least one intermediate metal support element having a resiliency greater than a resiliency of the metal principal support and a first conveyor configured to convey the mixture to impinge onto the first separation assembly and at least one second conveyor receiving a second mixture of agricultural produce and at least one of stones and clods from the first separation assembly and being configured to convey the second mixture to impinge at least on the second separation assembly.

In accordance with a preferred embodiment of the present invention the vehicle also includes at least one first collection bin configured to collect the agricultural produce and at least one second collection bin configured to collect at least one of the stones and the clods.

In accordance with yet another preferred embodiment of the present invention the vehicle also includes at least one recycling conveyor adapted to receive a third mixture of agricultural produce and at least one of stones and clods and to convey the third mixture to impinge on the first separation assembly. Additionally or alternatively, the vehicle also includes a harvesting assembly adapted to harvest the first mixture.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
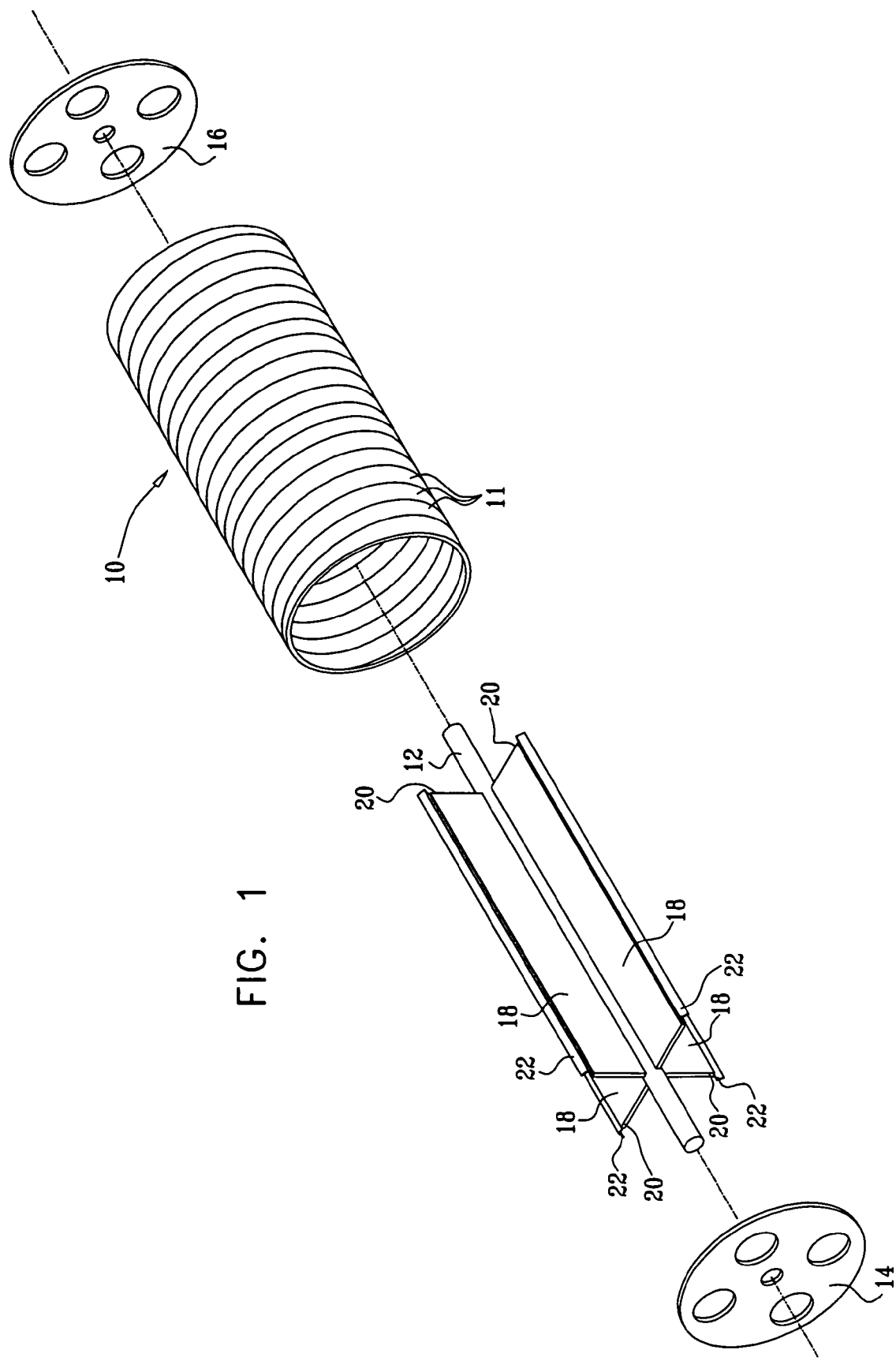
FIG. 1 is a simplified exploded view illustration of a separation assembly constructed and operative in accordance with a preferred embodiment of the present invention.
Figure 2:
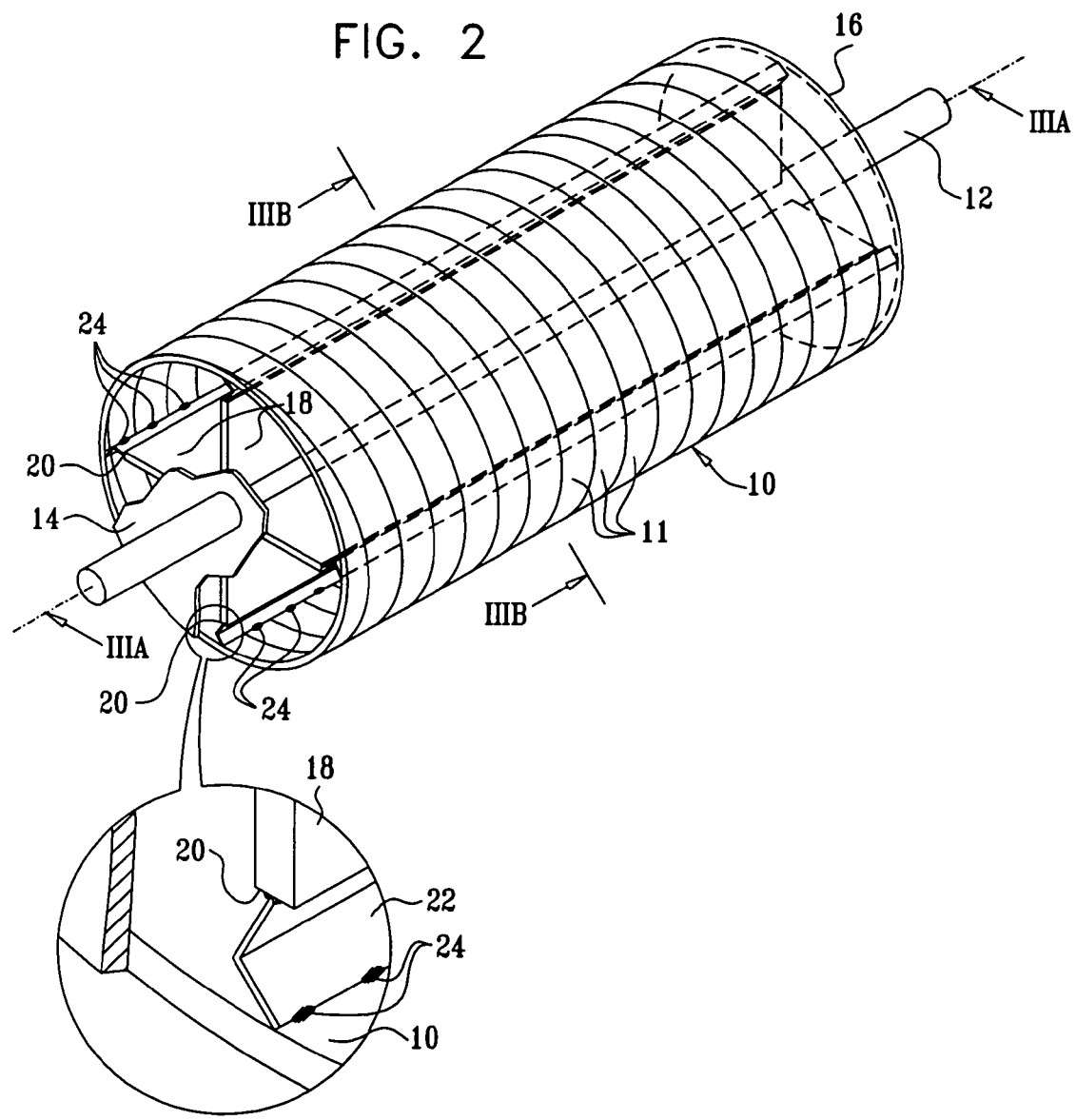
FIG. 2 is a simplified pictorial illustration of the separation assembly of FIG. 1.
Figure 3A:
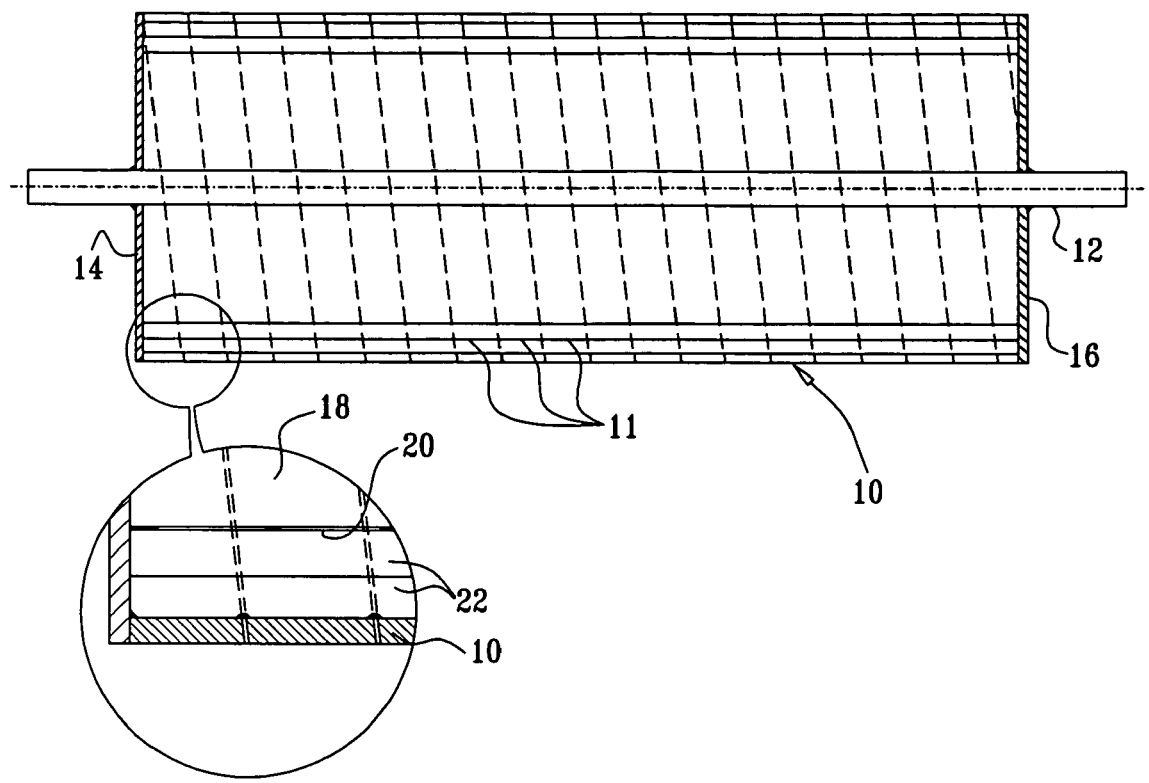
FIGS. 3A and 3B are sectional illustrations of the separation assembly of FIGS. 1 and 2, taken along respective section lines IIIA-IIIA and IIIB-IIIB in FIG. 2.
Figure 3B:
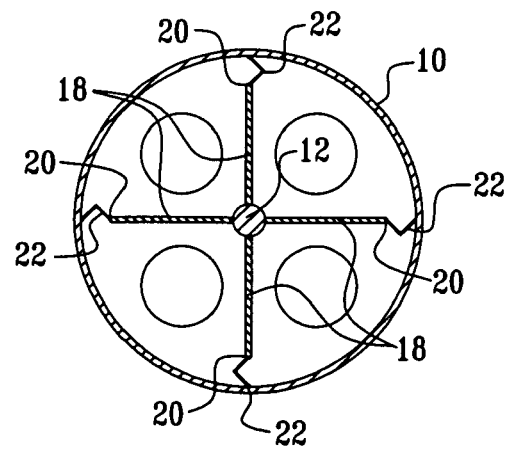
Figure 4:
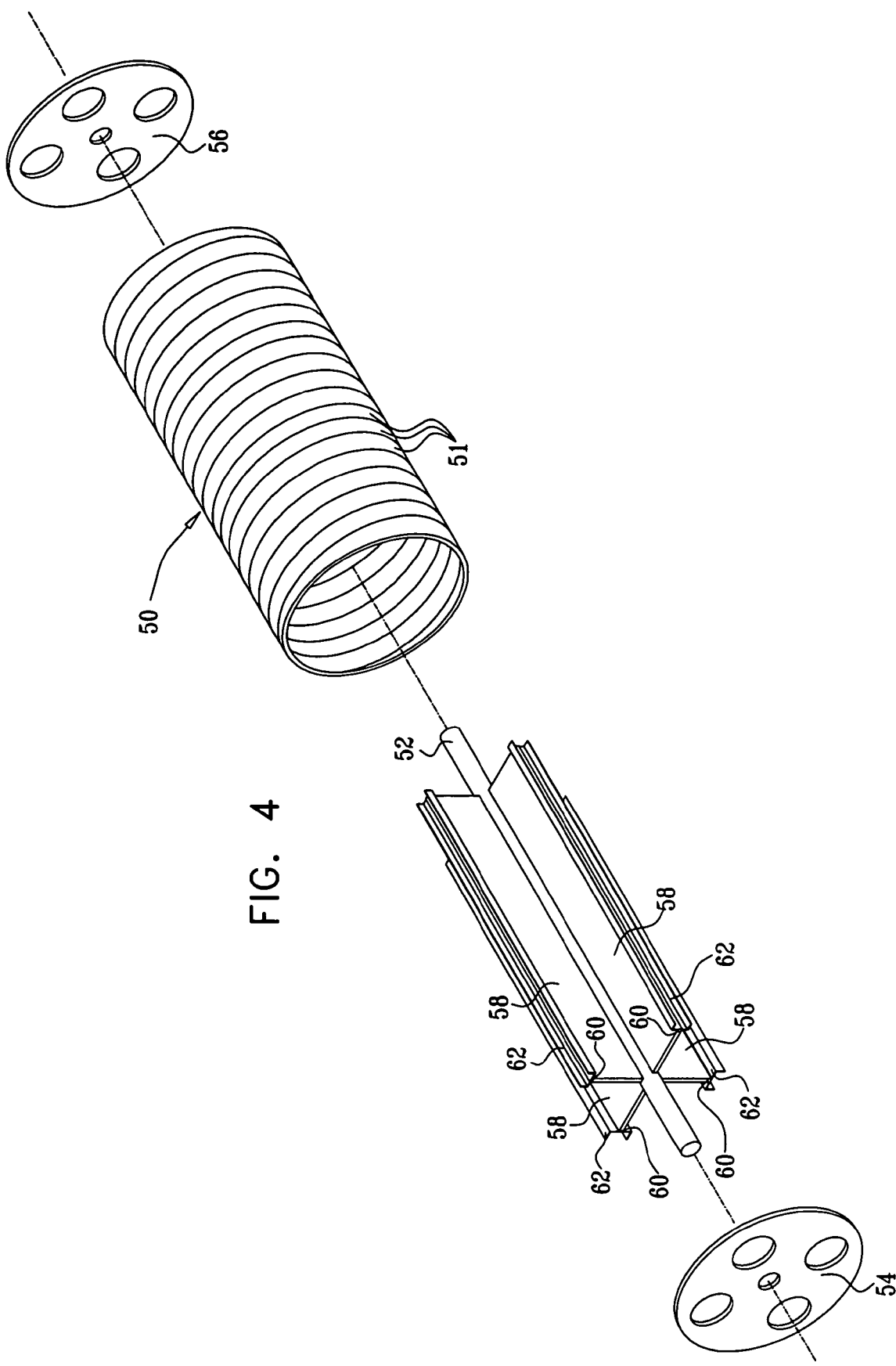
FIG. 4 is a simplified exploded view illustration of a separation assembly constructed and operative in accordance with another preferred embodiment of the present invention.
Figure 5:
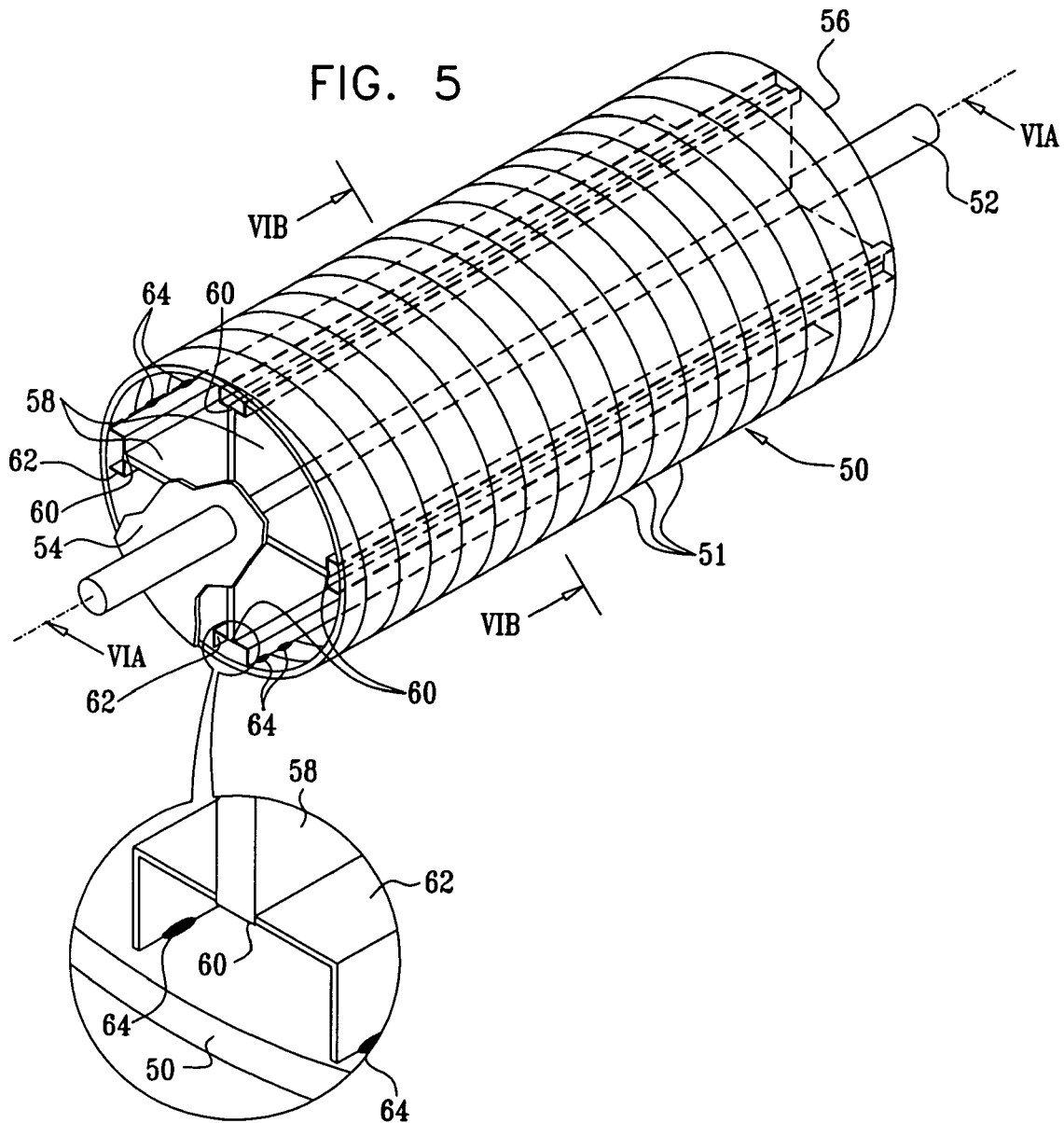
FIG. 5 is a simplified pictorial illustration of the separation assembly of FIG. 4.
Figure 6A:
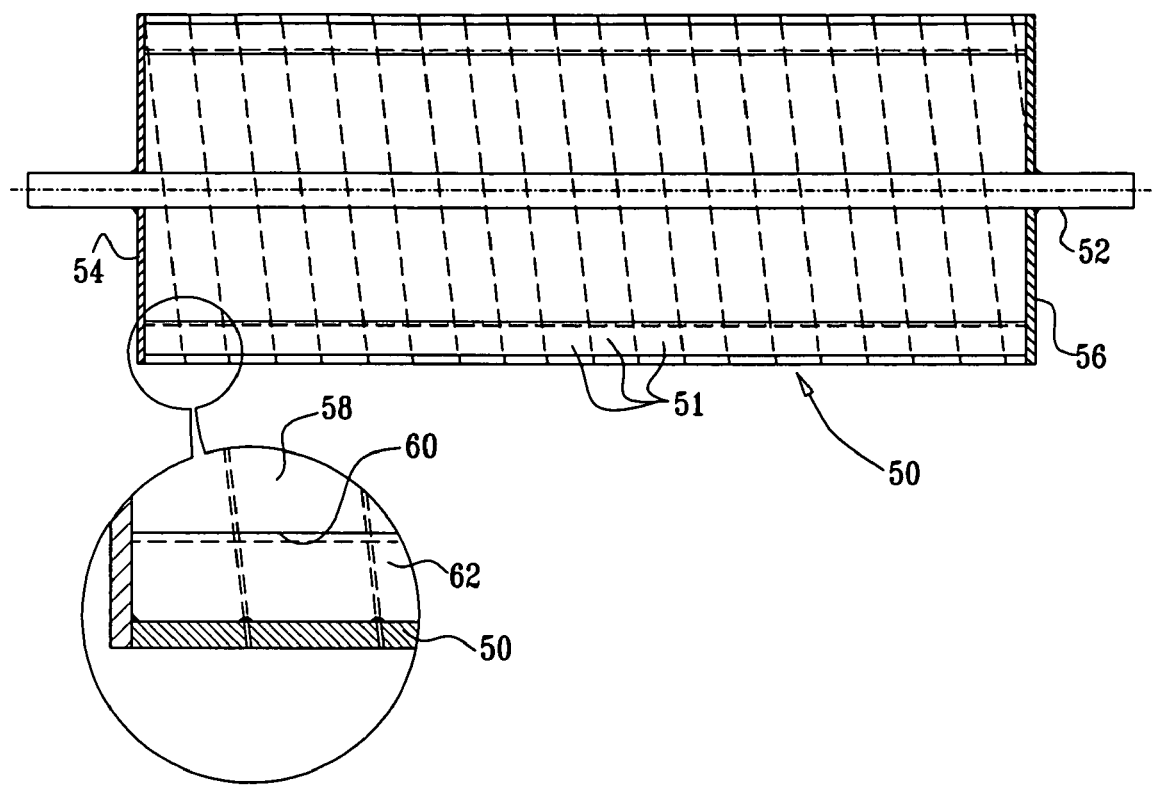
FIGS. 6A and 6B are sectional illustrations of the separation assembly of FIGS. 4 and 5, taken along respective section lines VA-VA and VB-VB in FIG. 5.
Figure 6B:
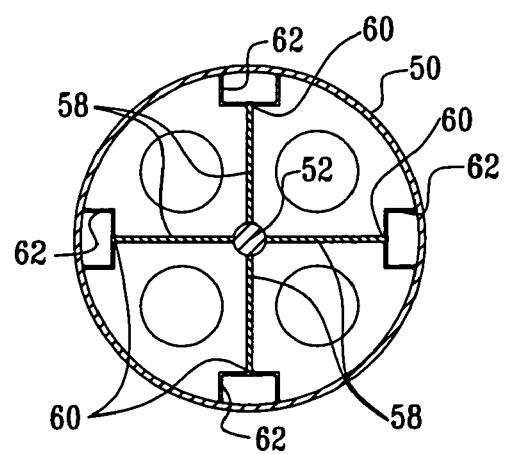

Reference is now made to FIGS. 1-3B, which illustrate a cylindrical separation assembly, particularly useful in separating potatoes from clods and stones, constructed and operative in accordance with a preferred embodiment of the present invention.

The separation assembly preferably comprises a cylinder 10, preferably formed of a plurality of flat steel rings 11, preferably 1020 steel of 5 mm thickness and 60 mm width. Each ring 11 is preferably of 320 mm outside diameter. Alternatively, cylinder 10 may be formed as a coil of flat steel.

Cylinder 10 is preferably supported on a longitudinal axle 12 by means of end plates 14 and 16, each welded at its center to axle 12 and at its outer circumference to ends of cylinder 10.

Cylinder 10 is preferably also supported on axle 12 by a plurality of axially and radially extending vanes 18, which are welded onto axle 12. In accordance with the preferred embodiment of the invention as shown in FIGS. 1-3B, the cylinder 10 is supported by four vanes 18. Vanes 18 are preferably formed of steel, preferably 1020 steel of 5 mm thickness.

At a radially outward facing edge 20 of each of vanes 18 there is welded an axial angled elongate connector element 22, which is also preferably welded to a plurality of rings 11 of cylinder 10 at welding spots 24. Connector elements 22 are preferably formed of steel, preferably 1020 steel of 2 mm thickness.

It is appreciated that each of connector elements 22 may be welded to a different subset of rings 11 of cylinder 10.

It is appreciated that the cylindrical separation assembly of the embodiment of FIGS. 1-3B is arranged to be impinged upon by a mixture of agricultural produce and one or more of stones and clods. Additionally, connector elements 22 preferably have a greater resiliency than the resiliency of axle 12 and/or vanes 18.

Reference is now made to FIGS. 4-6B, which illustrate a cylindrical separation assembly, particularly useful in separating potatoes from clods and stones, constructed and operative in accordance with a preferred embodiment of the present invention.

The separation assembly preferably comprises a cylinder 50, preferably formed of a plurality of flat steel rings 51, preferably 1020 steel of 5 mm thickness and 60 mm width. Each ring 51 is preferably of 320 mm outside diameter. Alternatively, cylinder 50 may be formed as a coil of flat steel.

Cylinder 50 is preferably supported on a longitudinal axle 52 by means of end plates 54 and 56, each welded at its center to axle 52 and at its outer circumference to ends of cylinder 50.

Cylinder 50 is preferably also supported on axle 52 by a plurality of axially and radially extending vanes 58, which are welded onto axle 52. In accordance with the preferred embodiment of the invention as shown in FIGS. 4-6B, the cylinder 50 is supported by four vanes 58. Vanes 58 are preferably formed of steel, preferably 1020 steel of 5 mm thickness.

At a radially outward facing edge 60 of each of vanes 58 there is welded an axial C-shaped elongate connector element 62, edges of which are also preferably welded to a plurality of rings 51 of cylinder 50 at welding spots 64. Connector elements 62 are preferably formed of steel, preferably 1020 steel of 2 mm thickness.

It is appreciated that each of connector elements 62 may be welded to a different subset of rings 51 of cylinder 50.

It is appreciated that the cylindrical separation assembly of the embodiment of FIGS. 4-6B is arranged to be impinged upon by a mixture of agricultural produce and one or more of stones and clods. Additionally, connector elements 62 preferably have a greater resiliency than the resiliency of axle 52 and/or vanes 58.

Figure 7:
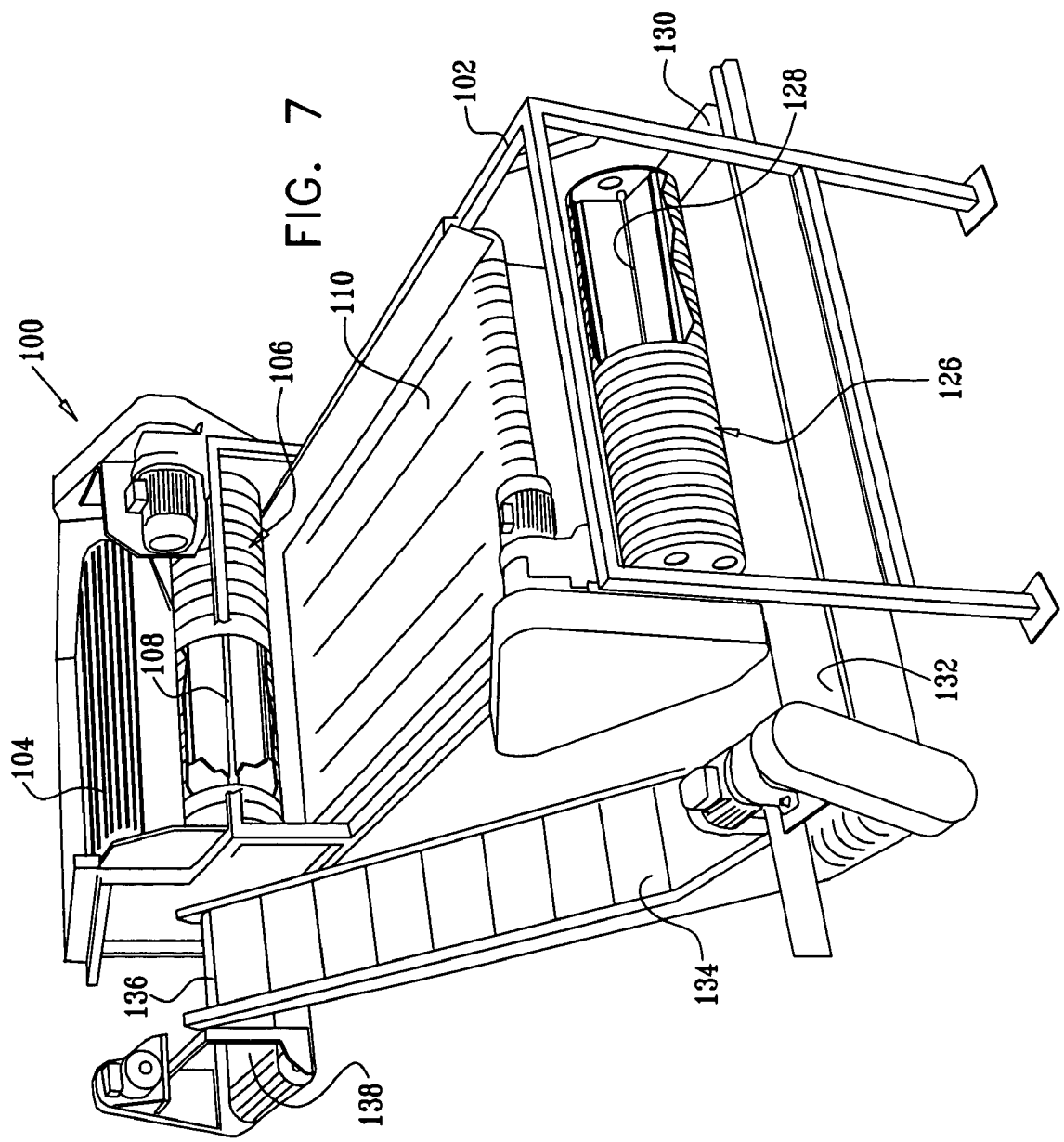
FIG. 7 is a simplified pictorial illustration of a stationary separator employing the separation assemblies of FIGS. 1-6B.

Reference is now made to FIG. 7, which is a simplified pictorial illustration of a static separator employing the separation assemblies of FIGS. 1-6B. The separator 100 comprises a base 102 onto which is mounted a feeding conveyor 104, which supplies a mixture of potatoes, clods and stones (and possibly other materials as well), so as to impinge on an impact surface of a cylindrical separation assembly 106, also mounted on base 102. Preferably, feeding conveyor 104 comprises a bar-type conveyor.

Preferably the height from which the mixture is dropped onto the separation assembly 106 is limited to about 250 mm, so as to limit damage to the agricultural produce. The separation assembly 106 is typically of the type of the embodiments of FIGS. 1-6B, described hereinabove and is arranged to be impinged at a surface thereof which is inclined between the horizontal and the vertical, typically having a tangent of 45 degrees with respect to the vertical. Preferably, the separator assembly 106 is rotated about its cylindrical axis 108, such that the location on the surface on which the mixture impacts has a horizontal component of motion, in a direction opposite to the horizontal component of motion of the mixture as it falls, which component of motion is imparted thereto by the horizontal component of motion of conveyor 104.

Alternatively the horizontal components of motion of the mixture and of the impact surface of the separator assembly 106 may be in the same direction.

First and second collection zones are defined by a first collection conveyor (not shown) and a second collection conveyor 110. The first collection conveyor, which is preferably near the separator assembly 106, receives the stones and clods, and the second collection conveyor 110, which is further from the separator assembly 106 receives the potatoes. Preferably, a divider element (not shown) separates the adjacent zones and ensures that material bounced from the separator assembly reaches one of the two conveyors depending on its precise position.

The material, which mainly includes potatoes but may also include clods, stones and other material, reaches the second collection conveyor 110 travels therealong so as to impinge on an impact surface of a second cylindrical separation assembly 126, also mounted on base 102.

Preferably the height from which the mixture is dropped onto the separation assembly 126 is limited to about 250 mm, so as to limit damage to the agricultural produce. The separation assembly 126 is typically of the type of the embodiments of FIGS. 1-6B, described hereinabove and is arranged to be impinged at a surface thereof which is inclined between the horizontal and the vertical, typically having a tangent of 45 degrees with respect to the vertical. Preferably, the separator assembly 126 is rotated about its cylindrical axis 128, such that the location on the surface on which the mixture impacts has a horizontal component of motion, in a direction opposite to the horizontal component of motion of the mixture as it falls, which component of motion is imparted thereto by the horizontal component of motion of conveyor 110.

Alternatively the horizontal components of motion of the mixture and of the impact surface of the separator assembly 126 may be in the same direction.

Potatoes or other agricultural produce, which bounce relatively far from the impact surface of the separator assembly 126, impinge on a slide portion (not shown) and are directed into a collection bin 130. The stones and clods, which bounce to a region relatively near to the impact surface of the separator assembly 126 impinge on an additional slide portion and are directed into a separate collection bin (not shown).

Intermediate the separating slide portions there is provided a gap (not shown) which permits the unseparated mixture of stones, clods and potatoes bounced thereto to fall on a conveyor 132, which carries them to a raising conveyor 134, which supplies that mixture, via a slide 136 to side conveyor area 138 for a single recycle through the separation apparatus.

Figure 8:
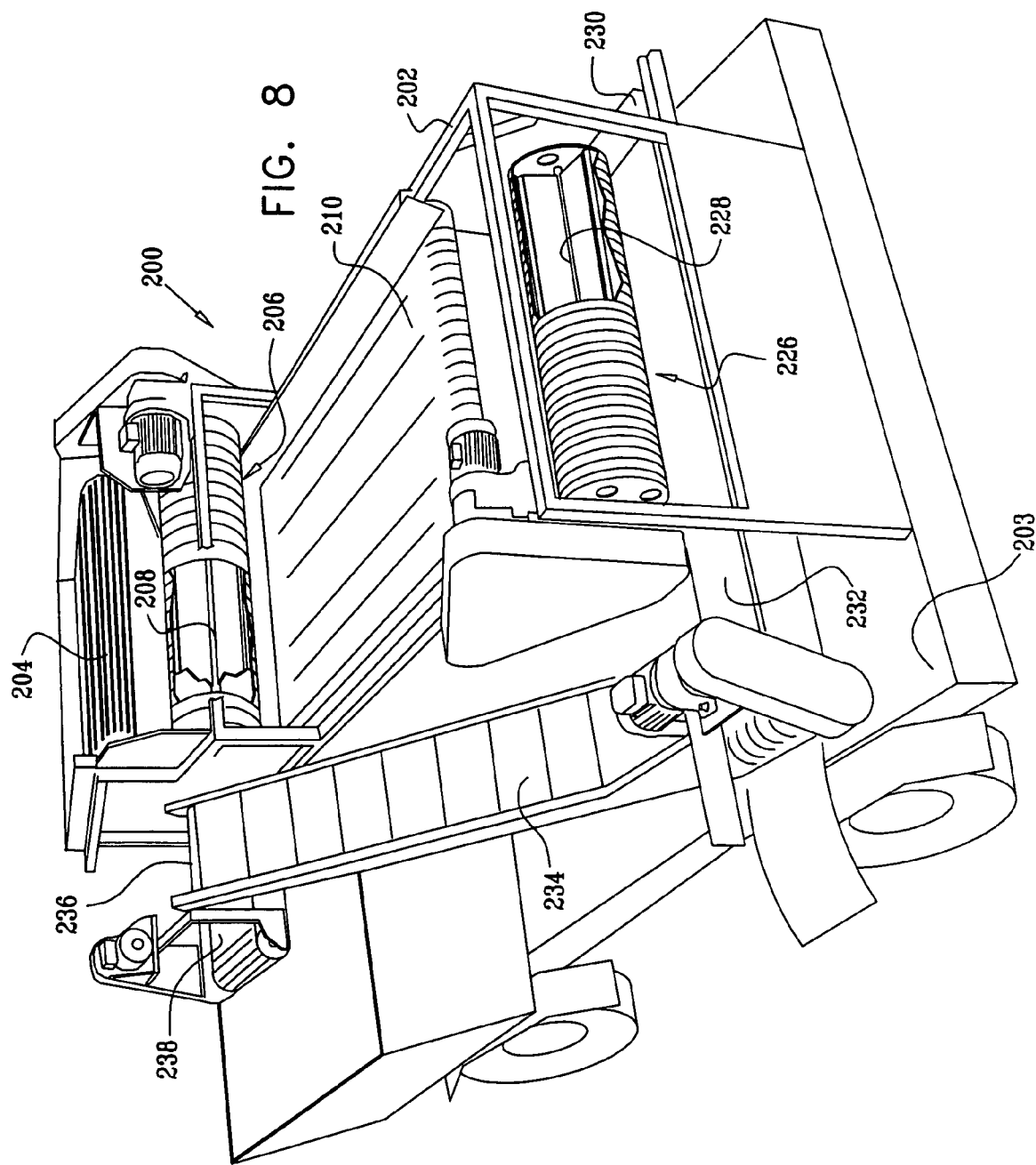
FIG. 8 is a simplified pictorial illustration of a mobile separator employing the separation assemblies of FIGS. 1-6B.

Reference is now made to FIG. 8, which is a simplified pictorial illustration of a mobile separator employing the separation assemblies of FIGS. 1-6B. The separator 200 comprises a base 202 mounted onto a vehicle 203, onto which is mounted a feeding conveyor 204, which supplies a mixture of potatoes, clods and stones (and possibly other materials as well), so as to impinge on an impact surface of a cylindrical separation assembly 206, also mounted on base 202. Preferably, feeding conveyor 204 comprises a bar-type conveyor.

Preferably the height from which the mixture is dropped onto the separation assembly 206 is limited to about 250 mm, so as to limit damage to the agricultural produce. The separation assembly 206 is typically of the type of the embodiments of FIGS. 1-6B, described hereinabove and is arranged to be impinged at a surface thereof which is inclined between the horizontal and the vertical, typically having a tangent of 45 degrees with respect to the vertical. Preferably, the separator assembly 206 is rotated about its cylindrical axis 208, such that the location on the surface on which the mixture impacts has a horizontal component of motion, in a direction opposite to the horizontal component of motion of the mixture as it falls, which component of motion is imparted thereto by the horizontal component of motion of conveyor 204.

Alternatively the horizontal components of motion of the mixture and of the impact surface of the separator assembly 206 may be in the same direction.

First and second collection zones are defined by a first collection conveyor (not shown) and a second collection conveyor 210. The first collection conveyor, which is preferably near the separator assembly 206, receives the stones and clods, and the second collection conveyor 210, which is further from the separator assembly 206 receives the potatoes. Preferably, a divider element (not shown) separates the adjacent zones and ensures that material bounced from the separator assembly reaches one of the two conveyors depending on its precise position.

The material, which mainly includes potatoes but may also include clods, stones and other material, reaches the second collection conveyor 210 travels therealong so as to impinge on an impact surface of a second cylindrical separation assembly 226, also mounted on base 202.

Preferably the height from which the mixture is dropped onto the separation assembly 226 is limited to about 250 mm, so as to limit damage to the agricultural produce. The separation assembly 226 is typically of the type of the embodiments of FIGS. 1-6B, described hereinabove and is arranged to be impinged at a surface thereof which is inclined between the horizontal and the vertical, typically having a tangent of 45 degrees with respect to the vertical. Preferably, the separator assembly 226 is rotated about its cylindrical axis 228, such that the location on the surface on which the mixture impacts has a horizontal component of motion, in a direction opposite to the horizontal component of motion of the mixture as it falls, which component of motion is imparted thereto by the horizontal component of motion of conveyor 210.

Alternatively the horizontal components of motion of the mixture and of the impact surface of the separator assembly 226 may be in the same direction.

Potatoes or other agricultural produce, which bounce relatively far from the impact surface of the separator assembly 226, impinge on a slide portion (not shown) and are directed into a collection bin 230. The stones and clods, which bounce to a region relatively near to the impact surface of the separator assembly 226 impinge on an additional slide portion and are directed into a separate collection bin (not shown).

Intermediate the separating slide portions there is provided a gap (not shown) which permits the unseparated mixture of stones, clods and potatoes bounced thereto to fall on a conveyor 232, which carries them to a raising conveyor 234, which supplies that mixture, via a slide 236 to side conveyor area 238 for a single recycle through the separation apparatus.

It will be apparent to persons skilled in the art that the present invention is not limited to what has been particularly shown and described hereinabove. Rather the scope of the present invention includes both combinations and subcombinations of features described and shown hereinabove as well as variations thereof which would occur to persons skilled in the art upon seeing the foregoing description and drawings and which are not in the prior art.

The invention claimed is:

1. An apparatus for separating agricultural produce from stones and clods comprising:
   at least one generally cylindrical separation assembly arranged to be impinged upon by a mixture of agricultural produce and at least one of stones and clods, said at least one generally cylindrical separation assembly comprising:
      a plurality of generally mutually contiguous curved impact portions; and
      a mounting assembly supporting said plurality of generally mutually contiguous curved impact portions, said mounting assembly comprising:
         a metal principal support and at least one intermediate metal support element fixed to said metal principal support and to at least some of said plurality of generally mutually contiguous curved impact portions, said at least one intermediate metal support element having a resiliency greater than a resiliency of said metal principal support,
         said metal principal support comprising an axle and a plurality of axially and radially extending vanes attached to said axle.

2. The apparatus for separating agricultural produce from stones and clods according to claim 1 and wherein said at least one intermediate metal support element has a resiliency greater than a resiliency of said curved impact portions.

3. The apparatus for separating agricultural produce from stones and clods according to claim 1 and wherein said at least one generally cylindrical separation assembly comprises a circular cylindrical assembly.

4. The apparatus for separating agricultural produce from stones and clods according to claim 1 and wherein said plurality of curved impact portions comprises a plurality of helical rings.

5. The apparatus for separating agricultural produce from stones and clods according to claim 1 and wherein said plurality of curved impact portions comprises a coil.

6. An apparatus for separating agricultural produce from stones and clods, comprising:
   at least a first and a second generally cylindrical separation assemblies arranged to be impinged upon by a mixture of agricultural produce and at least one of stones and clods, each of said at least first and second generally cylindrical separation assemblies comprising:
   a plurality of generally mutually contiguous curved impact portions; and
   a mounting assembly supporting said plurality of generally mutually contiguous curved impact portions, said mounting assembly comprising:
      a metal principal support and at least one intermediate metal support element fixed to said metal principal support and to at least some of said plurality of generally mutually contiguous curved impact portions, said at least one intermediate metal support element having a resiliency greater than a resiliency of said metal principal support, said metal principal support comprising an axle and a plurality of axially and radially extending vanes attached to said axle;
   a first conveyor configured to convey said mixture to impinge onto said first separation assembly; and
   at least one second conveyor receiving a second mixture of agricultural produce and at least one of stones and clods from said first separation assembly and being configured to convey said second mixture to impinge at least on said second separation assembly.

7. The apparatus for separating agricultural produce from stones and clods according to claim 6 and also comprising:
   at least one first collection bin configured to collect said agricultural produce; and
   at least one second collection bin configured to collect said at least one of stones and clods.

8. The apparatus for separating agricultural produce from stones and clods according to claim 6 and also comprising at least one recycling conveyor adapted to receive a third mixture of agricultural produce and said at least one of stones and clods and to convey said third mixture to impinge on said first separation assembly.

9. A vehicle for separating agricultural produce from stones and clods, comprising:
   a mounting vehicle;
   at least a first and a second generally cylindrical separation assemblies mounted onto said mounting vehicle and arranged to be impinged upon by a first mixture of agricultural produce and at least one of stones and clods, each of said at least first and second generally cylindrical separation assemblies comprising:
   a plurality of generally mutually contiguous curved impact portions; and
   a mounting assembly supporting said plurality of generally mutually contiguous curved impact portions, said mounting assembly comprising:
      a metal principal support and at least one intermediate metal support element fixed to said metal principal support and to at least some of said plurality of generally mutually contiguous curved impact portions, said at least one intermediate metal support element having a resiliency greater than a resiliency of said metal principal support, said metal principal support comprising an axle and a plurality of axially and radially extending vanes attached to said axle;
   a first conveyor configured to convey said mixture to impinge onto said first separation assembly; and
   at least one second conveyor receiving a second mixture of agricultural produce and said at least one of stones and clods from said first separation assembly and being configured to convey said second mixture to impinge at least on said second separation assembly.

10. The vehicle for separating agricultural produce from stones and clods according to claim 9 and also comprising:
    at least one first collection bin configured to collect said agricultural produce; and
    at least one second collection bin configured to collect said at least one of stones and clods.

11. The vehicle for separating agricultural produce from stones and clods according to claim 9 and also comprising at least one recycling conveyor adapted to receive a third mixture of agricultural produce and said at least one of stones and clods and to convey said third mixture to impinge on said first separation assembly.

12. The vehicle for separating agricultural produce from stones and clods according to claim 9 and also comprising a harvesting assembly adapted to harvest said first mixture.

13. The apparatus for separating agricultural produce from stones and clods according to claim 1 and wherein said plurality of axially and radially extending vanes are welded to said axle.

14. The apparatus for separating agricultural produce from stones and clods according to claim 1 and wherein said plurality of axially and radially extending vanes comprises 4 vanes.

15. The apparatus for separating agricultural produce from stones and clods according to claim 1 and wherein said plurality of axially and radially extending vanes are formed of steel.

16. The apparatus for separating agricultural produce from stones and clods according to claim 1 and wherein said plurality of axially and radially extending vanes are formed of 1020 steel of 5 mm thickness.

17. The apparatus for separating agricultural produce from stones and clods according to claim 1 and wherein each of said at least one intermediate metal support element is fixed to said metal principal support at a radially outward facing edge of one of said axially and radially extending vanes.

18. The apparatus for separating agricultural produce from stones and clods according to claim 1 and wherein each of said at least one intermediate metal support element is welded to said metal principal support at a radially outward facing edge of one of said axially and radially extending vanes.

19. The apparatus for separating agricultural produce from stones and clods according to claim 1 and wherein said at least one intermediate metal support element is formed of steel.

20. The apparatus for separating agricultural produce from stones and clods according to claim 1 and wherein said at least one intermediate metal support element is formed of 1020 steel of 2 mm thickness.

21. The apparatus for separating agricultural produce from stones and clods according to claim 1 and wherein different ones of said at least one intermediate metal support element are fixed to different ones of said plurality of generally mutually contiguous curved impact portions.

22. The apparatus for separating agricultural produce from stones and clods according to claim 1 and wherein different ones of said at least one intermediate metal support element are welded to different ones of said plurality of generally mutually contiguous curved impact portions.

* * * * *